Sept. 29, 1931.  F. J. WOOD  1,825,610
COUNTERBALANCE
Filed March 31, 1930

Fernando J. Wood
INVENTOR

BY Victor J. Evans
ATTORNEY

Patented Sept. 29, 1931

1,825,610

UNITED STATES PATENT OFFICE

FERNANDO J. WOOD, OF PAMPA, TEXAS

COUNTERBALANCE

Application filed March 31, 1930. Serial No. 440,487.

This invention relates to new and useful improvements in a counter balance for standard rig band wheel shaft and located at the opposite end from the usual crank and has for its primary object the provision of a device of the above stated character whereby the counter balance weight may be easily and quickly adjusted relative to the shaft and locked in any of its various adjusted positions, and also capable of an adjustment to compensate for the weight of the means employed to secure the weight to the shaft whereby the influence of the weight and the associated parts will not affect the shaft.

Another object of this invention is the provision of a counter balance of the above stated character, which will be simple, durable, and efficient and which may be manufactured and sold at a comparatively low cost.

With these and other objects in view as will become more apparent as the description proceeds, the invention consists in certain novel features of construction and arrangement of parts, as will be hereinafter more fully described and claimed.

For a complete understanding of my invention reference is to be had to the following description and accompanying drawings in which.

Figure 1:
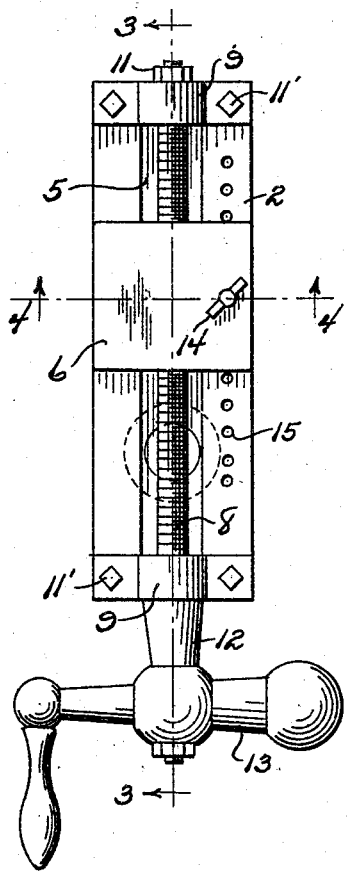
Figure 1 is a side elevation illustrating a counter-balance constructed in accordance with my invention.
Figure 3:
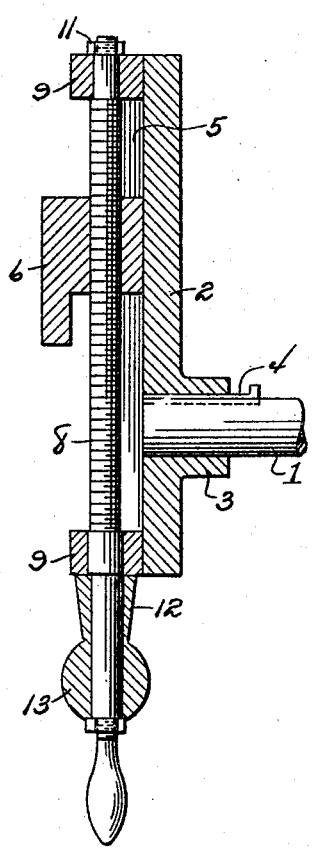
Figure 3 is a sectional view taken on the line 3—3 of Figure 1.
Figure 2:
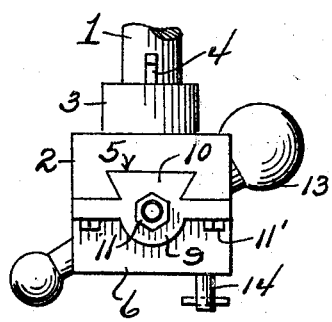
Figure 2 is a plan view illustrating the same.
Figure 4:
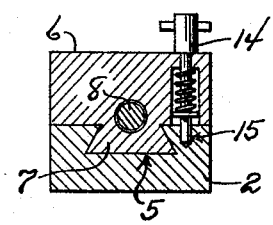
Figure 4 is a sectional view taken on the line 4—4 of Figure 1.

Referring in detail to the drawings, the numeral 1 indicates a fragmentary portion of a standard rig band wheel shaft and which has at its opposite end a crank (not shown) for reciprocating another element. To compensate for the crank during the rotation of the shaft my invention is secured to the shaft as shown at Figure 3.

An arm 2 of considerable length has a boss 3 formed on one face thereof and adjacent to one end to receive the end of the shaft 1 and the latter is secured in the boss by a key 4 and also may have a machined fit. The arm 2 upon the opposite face from the boss 3 is provided with the dove-tail groove 5 extending the full length of the arm and slidably receives a weight 6, the latter having a portion thereof formed into a dove-tail tongue 7 received within the dove-tail groove 5. The weight 6 is provided with a bore, the walls of which are screw threaded to cooperate with the threads on an adjusting rod 8 and the latter is journaled in bearings 9 at each end of the arm 2. The bearings 9 are provided with dove-tail tongues 10 fitting in the dove-tail groove 5 and are further secured to the arm 2 by bolts 11. The adjusting rod 8 is limited in an endwise movement in one direction by a nut 11 and in an opposite direction by a sleeve 12 forming a part of the handle 13 secured to the rod 8 by a suitable nut. The rotation of the rod 8 by a handle 13 will cause the weight to move relative to the shaft 1 and on the arm 2 and thereby permit a person to easily and quickly vary the action of the weight on the shaft. The weight 6 carries a spring pressed element 14 to be received in any one of the series of sockets 15 located in the arm 2 for locking the weight in any of its adjusted positions.

From the foregoing description taken in connection with the drawings, it will be seen that the weight 6 may be easily and quickly adjusted relative to the shaft 1 by rotating the adjusting rod 8 in the proper direction, and when it is desired to relieve the shaft 1 from a counter balanced affect, the weight 6 is adjusted to the short end of the arm 2 and is recessed to receive one of the bearings 9 so that the weight will be positioned relative to the shaft so that it will compensate for the weight of the long end of the arm 2 and permit the shaft to rotate as if the whole device had been removed.

While I have shown and described the preferred embodiment of my invention it will be understood that minor changes in construction, combination and arrangement of parts may be made without departing from the spirit and scope of the invention as claimed.

Having thus described my invention what I claim is:

A counterbalance comprising an elongated body fixed to a crank shaft adjacent one end and having a dove-tail groove in one face and extending the full length thereof, bearings having dove-tail portions fitting in the groove, fasteners securing the bearings to the body at the ends thereof, a feed shaft journalled in the bearings and extending parallel with the groove, a weight having a screw-threaded bore receiving the feed shaft and having a dove-tail extension in the groove and adjustable along said groove by the feed screw, said body having spaced sockets adjacent the groove, and a spring pressed element carried by the weight to engage any one of the sockets for locking the weight in various adjusted positions on the body.

In testimony whereof I affix my signature.

FERNANDO J. WOOD.